United States Patent
Schafer et al.

(10) Patent No.: US 6,290,247 B1
(45) Date of Patent: *Sep. 18, 2001

(54) BICYCLE TRAILER HITCH

(76) Inventors: Gary L. Schafer; Diane Schafer, both of 42734 Whittier Ave., Hemet, CA (US) 92544

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/496,770

(22) Filed: Feb. 3, 2000

(51) Int. Cl.[7] .................................................. B62K 27/12
(52) U.S. Cl. .................. 280/292; 280/490.1; 280/491.5; 280/495
(58) Field of Search .................. 280/292, 456.1, 280/460.1, 467, 482, 490.1, 491.5, 495, 496, 204

(56) References Cited

U.S. PATENT DOCUMENTS

| | | | |
|---|---|---|---|
| D. 376,773 | 12/1996 | Bell | D12/101 |
| 667,154 | 1/1901 | McDonald | |
| 718,322 | * 1/1903 | Davis | 280/292 |
| 947,945 | * 2/1910 | Sampson | 280/204 |
| 2,283,716 | * 5/1942 | Zalimeni | 280/204 |
| 2,370,988 | * 3/1945 | Neal | 280/292 |
| 3,387,859 | * 6/1968 | McClellan | 280/490.1 |
| 3,598,426 | * 8/1971 | Spiese | 280/204 |
| 3,937,489 | * 2/1976 | Hawes et al. | 280/204 |
| 3,993,321 | * 11/1976 | Cote | 280/204 |
| 3,999,777 | * 12/1976 | McGrath, Jr. | 280/292 |
| 4,266,799 | * 5/1981 | Wood | 280/482 |
| 4,721,320 | * 1/1988 | Creps et al. | 280/292 |
| 4,736,963 | 4/1988 | Bettencourt | 280/460 |
| 5,039,120 | 8/1991 | Stowe | 280/204 |
| 5,149,122 | * 9/1992 | Helber | 280/491.1 |
| 5,171,034 | * 12/1992 | Scott | 280/292 |
| 5,242,178 | 9/1993 | Galasso | 280/204 |
| 6,050,581 | * 4/2000 | Everett | 280/495 |
| 6,099,011 | * 8/2000 | Beaudoin et al. | 280/292 |

FOREIGN PATENT DOCUMENTS

| | | |
|---|---|---|
| 0 589 480 A1 | 9/1993 | (DE) . |
| 461323 | * 12/1991 | (EP) ..................... 280/204 |

* cited by examiner

*Primary Examiner*—Daniel G. DePumpo
(74) *Attorney, Agent, or Firm*—Rudolf O. Siegesmund

(57) ABSTRACT

A bicycle trailer hitch employs an adjustably positioned universal hitch ball. The bicycle trailer hitch attaches to a hitch receiver mounted on the bicycle frame and encompasses the rear tire of the bicycle. The trailer hitch slides into the hitch brackets and is secured by clevis pins. Height adjustments between the hitch and the trailer are made with two "L" shaped brackets. The lower bracket has the ball joint attached. The trailer tongue is attached to the ball joint.

3 Claims, 4 Drawing Sheets

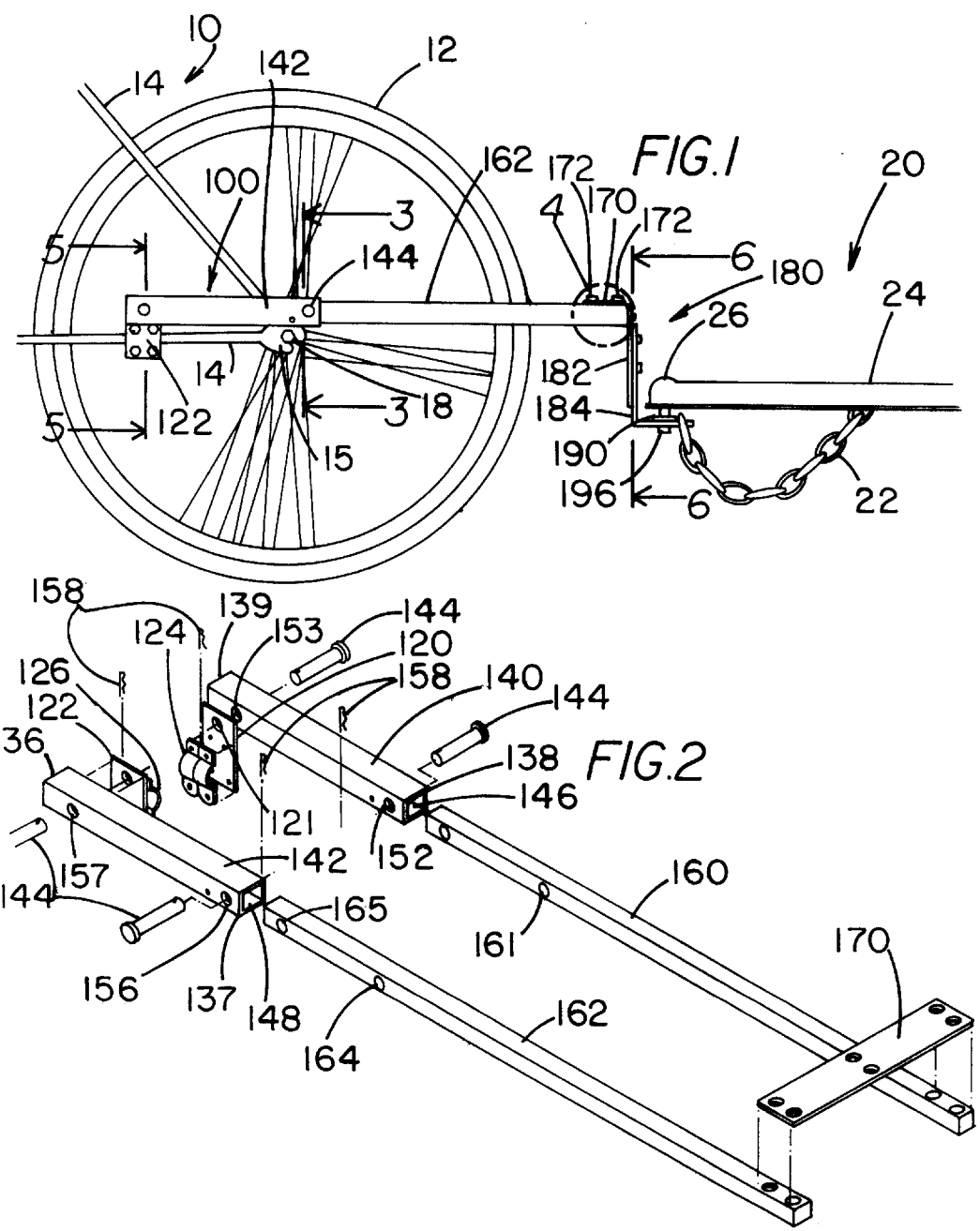

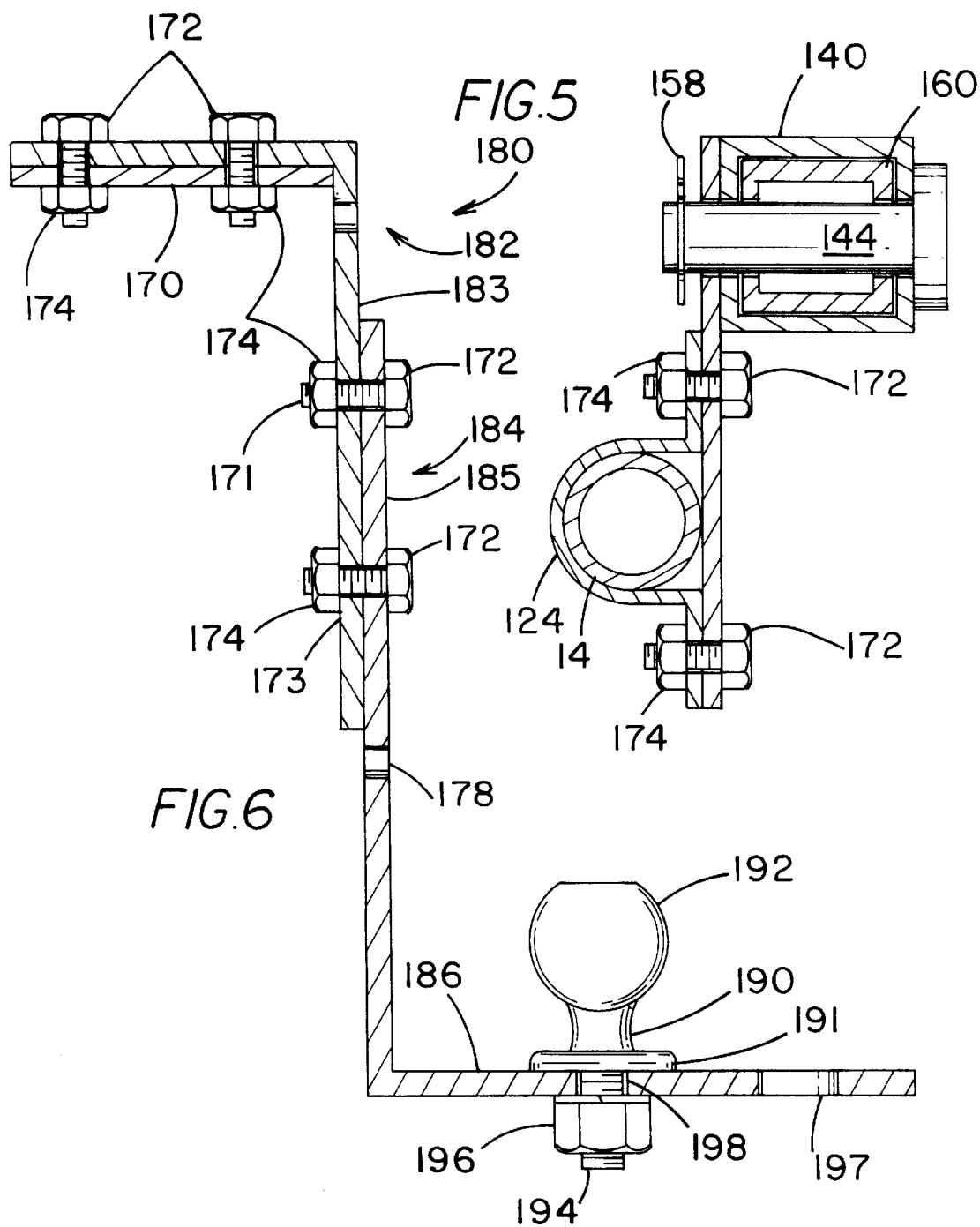

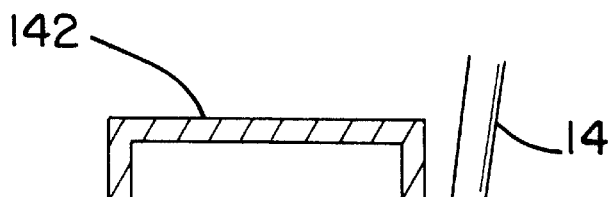
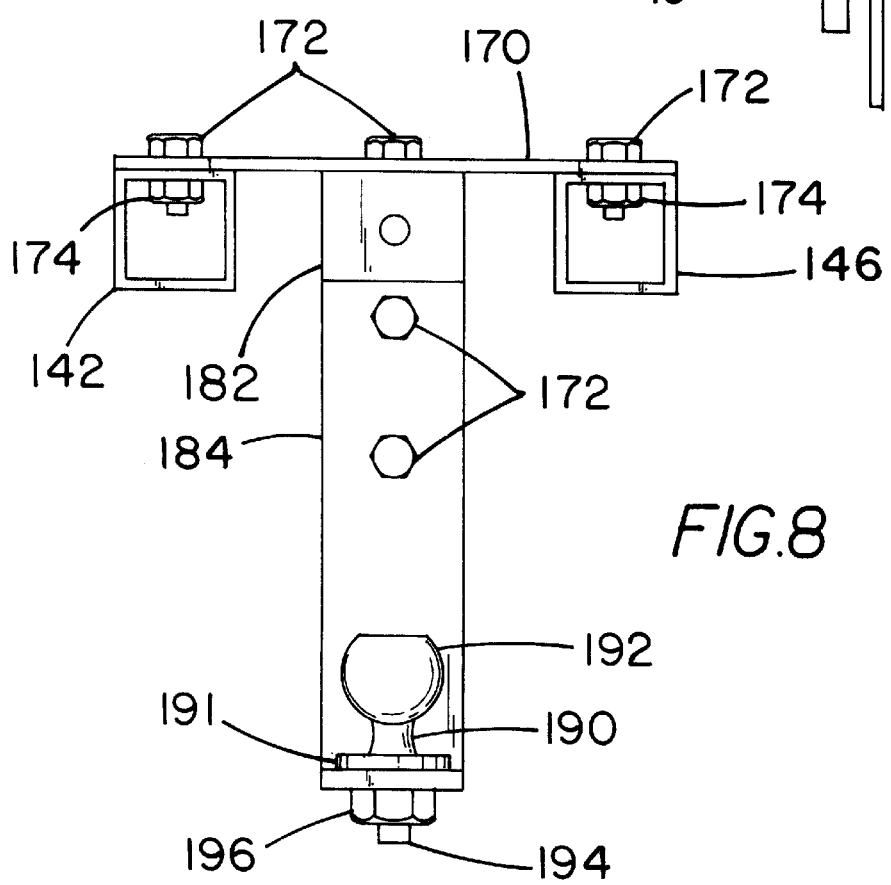

BICYCLE TRAILER HITCH

BACKGROUND OF THE INVENTION

1. Field of the Invention

The present invention relates to an apparatus for connecting a trailer to a bicycle.

2. Description of the Prior Art

Bicycle trailers have gained increased popularity over the years. One requirement for a bicycle trailer is that it articulate universally relative to the bicycle. U.S. Pat. No. 5,242, 178 discloses a bicycle trailer hitch removably affixed to the chain stay portion of the bicycle frame. What is needed beyond the prior art is a trailer hitch that is rugged, that is adaptable to a variety of trailers using a universal trailer ball, that can be removed from the bicycle when not needed, and that can be quickly and easily reinstalled when required.

SUMMARY OF THE INVENTION

The present invention meets the needs and solves the problems identified above by providing a bicycle trailer hitch employing an adjustably positioned universal hitch ball. The bicycle trailer hitch is generally "U" shaped and attaches to the a hitch receiver mounted on the bicycle frame and encompasses the rear tire of the bicycle. The trailer hitch slides into the hitch brackets and is secured by clevis pins. Height adjustments between the hitch and the trailer are made with two "L" shaped brackets. One of the brackets is attached to a mounting plate affixed to the hitch. The second bracket can then be lined up accordingly and connected using nut and bolt securement devices. The lower bracket has the ball joint attached. The trailer tongue of the trailer arm can be attached to the ball joint. A safety chain attached to the lower bracket and the trailer tongue provides a back-up connection between the trailer hitch and the trailer.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 1 is a left side view of the invention mounted on a bicycle frame.

FIG. 2 is a left perspective exploded view of the hitch mount.

FIG. 5 is a cross sectional view along line 5—5 in FIG. 1.

FIG. 6 is a cross sectional view along line 6—6 in FIG. 1.

FIG. 7 is a cross sectional view of the left hitch bracket receiver.

FIG. 8 is a front view of the hitch adjuster plate.

DESCRIPTION OF PREFERRED EMBODIMENTS

Figure 3:
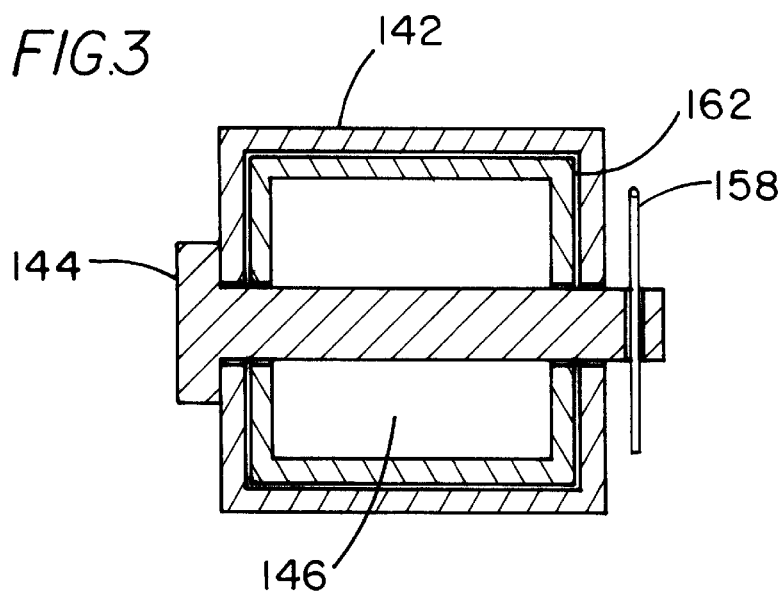
FIG. 3 is a cross sectional view along line 3—3 in FIG. 1.

In FIG. 1, bicycle 10 has tire 12, frame 14, wheel mounting socket 15, and axle 18. Left hitch bracket receiver 142 is connected to frame 14 by left mounting bracket 122. Left hitch bracket 162 is connected to left hitch bracket receiver 142 by clevis pin 144 and hitch adjuster 180 is connected to left hitch bracket 162 by bolts 172. Hitch adjuster 180 has first bracket 182 and second bracket 184. Hitch ball 192 (not shown, see FIG. 6) is connected to second bracket 184 by hitch ball arm 190 and hitch ball nut 194. Hitch adjuster first plate 182 is connected to hitch adjuster second plate 184. Hitch adjuster first plate 182 is connected to mounting plate 170. Trailer arm 20 has arm 24, hitch ball dome 26 and chain 22. In the preferred embodiment, left hitch bracket receiver 142 and right hitch bracket receiver 140 are made from 1 and ¼ inch square steel or aluminum tubing. In the preferred embodiment, left hitch bracket 162 and right hitch bracket 160 are made from 1 inch steel or aluminum tubing. Trailer tongue 26 is attached to ball joint 192 (not shown in FIG. 1). Safety chain 22 attaches to second hitch adjuster 184.

In FIG. 2, right hitch bracket receiver 140 has right hitch bracket receiver first end 139 and right hitch bracket receiver second end 138. Right hitch bracket receiver 140 has first right hitch bracket receiver hole 153 and second right hitch bracket receiver hole 152 for receiving clevis pins 144. Right hitch bracket receiver 140 has right mounting bracket 120 fixedly engaged to right hitch bracket receiver 140. In the preferred embodiment, right mounting bracket 120 is welded to right hitch bracket receiver 140. Right mounting bracket 120 has right mounting bracket hole 121 for receiving clevis pin 144. Right mounting bracket hole 121 is aligned with first right hitch bracket receiver hole 153 nearest right hitch bracket receiver first end 139. Right hitch bracket 160 has first right hitch bracket hole 163 and second right hitch bracket hole 161 for receiving clevis pins 144 and slides within right hitch bracket receiver interior 146 until first right hitch bracket hole 163 is aligned with first right hitch bracket receiver hole 154 and second right hitch bracket hole 164 is aligned with second right hitch bracket receiver hole 152. Correspondingly, left hitch bracket receiver 142 has left hitch bracket receiver first end 136 and left hitch bracket receiver second end 137. Left hitch bracket receiver 142 has first left hitch bracket receiver hole 157 and second left hitch bracket receiver hole 156 for receiving clevis pins 144. Left hitch bracket receiver 142 has left mounting bracket 122 fixedly engaged to left hitch bracket receiver 142. In the preferred embodiment, left mounting bracket 122 is welded to left hitch bracket receiver 142. Left mounting bracket 122 has left mounting bracket hole 122 for receiving clevis pin 144. Left mounting bracket hole 122 is aligned with first left hitch bracket receiver hole 157 nearest left hitch bracket receiver first end 136. Left hitch bracket 162 has first left hitch bracket hole 165 and second left hitch bracket hole 164 for receiving clevis pins 144 and slides within left hitch bracket receiver interior 146 until first left hitch bracket hole 165 is aligned with first left hitch bracket receiver hole 157 and second left hitch bracket hole 164 is aligned with second left hitch bracket receiver hole 156. Hitch adjuster mounting plate 170 is affixed to right hitch bracket 160 and left hitch bracket 162 by bolts 172 and nuts 174 (not shown, see FIG. 4 and 6).

FIG. 3 depicts a cross sectional view along line 3—3 of FIG. 1. Clevis pin 144 is inserted through left hitch bracket receiver 142 and left hitch bracket 162 and held in place by cotter pin 158.

Figure 4:
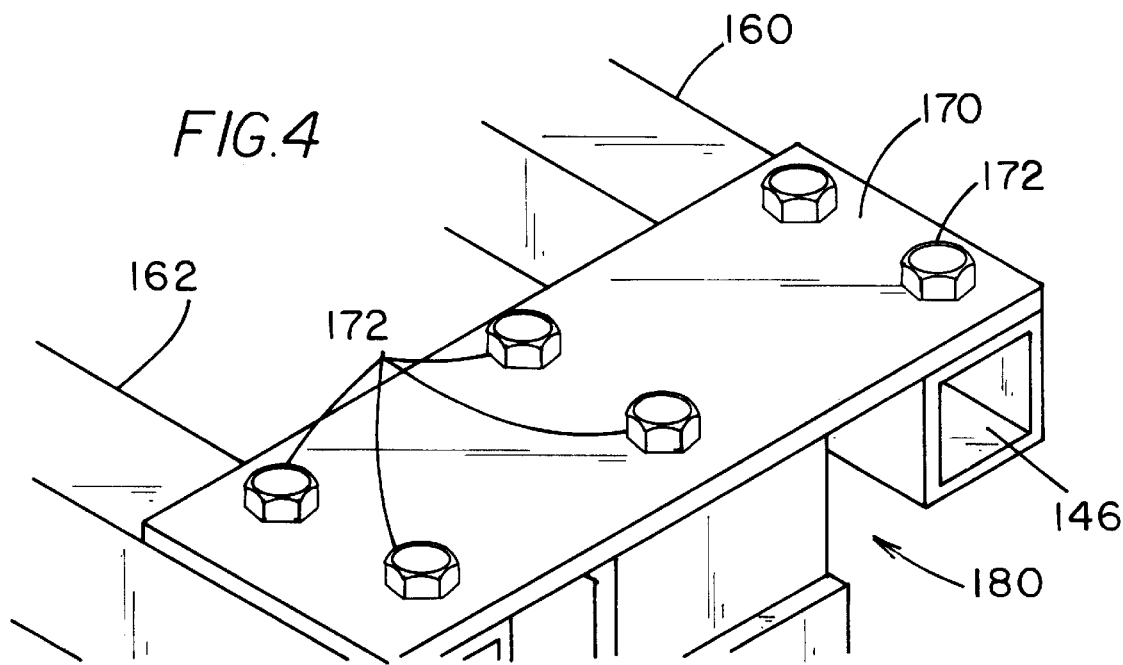
FIG. 4 is a detail view of the hitch mounting plate.

FIG. 4 is a detail view of hitch adjuster mounting plate 170 affixed to right hitch bracket 160 and left hitch bracket 162 by a plurality of bolts 170. Hitch adjuster 180 is affixed to hitch adjuster mounting plate 170 by bolts 172.

In FIG. 5 connector 124 is positioned around frame 14 and affixed to right mounting plate 120 by bolts 172 and nuts 174. Right hitch bracket 160 is shown locket into position within right hitch bracket receiver 140 by clevis pin 144 and cotter pin 158.

In FIG. 6, hitch adjuster first plate horizontal section 181 has first top hole and second top hole for receiving bolts 172. Hitch adjuster first plate vertical section 183 has a plurality of holes for receiving bolts 172. Hitch adjuster second plate 184 has hitch adjuster second plate vertical section 185 and hitch adjuster second plate horizontal section 186. Hitch adjuster second plate vertical section 185 has a plurality of holes for receiving bolts 172. Hitch adjuster second plate horizontal section has hitch hole 198 for receiving hitch threaded post 194 for securement with hitch nut 196.

In FIG. 7 a cross sectional view along line 3—3 of FIG. 1 is shown. Left hitch bracket receiver 142 is further secured to frame 14 by screw 128 seated in countersunk hole 127 of bracket 15 of frame 14. Screw 128 is tightened by screwdriver 11 which enters left hitch bracket receiver 142 through left hitch bracket receiver access hole.

In FIG. 8, a front view of hitch adjuster plate 184 is shown affixed to mounting plate 170. In the preferred embodiment, mounting plate 170 is made of ¼ inch steel.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A combination bicycle and trailer hitch comprising:
    a bicycle having a left frame and a left bracket fixedly engaged to said left frame and a right frame and a right bracket fixedly engaged to said right frame;
    a left hitch bracket receiver removably engaged to the left frame of the bicycle;
    a right hitch bracket receiver removably engaged to the right frame of the bicycle;
    a left hitch bracket removably engaged to said left hitch bracket receiver;
    a right hitch bracket removably engaged to said right hitch bracket receiver;
    a hitch adjuster mounting plate removably engaged to said left hitch bracket and to said right hitch bracket;
    a hitch adjuster removably engaged to said hitch adjuster mounting plate;
    a hitch ball removably engaged to said hitch adjuster;
    a plurality of left hitch bracket receiver holes;
    a plurality of right hitch bracket receiver holes;
    a plurality of left hitch bracket holes;
    a plurality of right hitch bracket holes;
    a plurality of clevis pins;
    wherein said hitch adjuster comprises a first hitch adjuster plate and a second hitch adjuster plate;
    wherein a height of said hitch ball can be adjusted by changing the relative positions of said first hitch adjuster plate and said second hitch adjuster plate; and
    wherein said left hitch bracket and said right hitch bracket may be removed so that the hitch ball may be removed from the bicycle when it is not needed and replaced on the bicycle when needed by respectively removing or inserting the clevis pins.

2. The apparatus of claim 1 further comprising:
    a left mounting plate fixedly engaged to said left hitch bracket receiver;
    a right mounting plate fixedly engaged to said right hitch bracket receiver;
    a left connector removably engaged to said left mounting plate; and
    a right connector removably engaged to said right mounting plate;
    wherein said left hitch bracket receiver and said right hitch bracket receiver can be removably engaged to said frame by engagement of said left mounting plate and said left connector to said frame and by engagement of said right mounting plate and said right connector to said frame.

3. An apparatus for removably affixing a trailer to a bicycle having a left frame, a left bracket fixedly engaged to said left flame, a right frame and a right bracket fixedly engaged to said right bracket comprising:
    a left hitch bracket receiver adapted to be removably engaged to the left frame of the bicycle;
    a right hitch bracket receiver adapted to be removably engaged to the right frame of the bicycle;
    a left mounting plate fixedly engaged to said left hitch bracket receiver;
    a right mounting plate fixedly engaged to said right hitch bracket receiver;
    a left connector removably engaged to said left mounting plate;
    a right connector removably engaged to said right mounting plate;
    a plurality of left hitch bracket receiver holes;
    a plurality of right hitch bracket receiver holes;
    a left hitch bracket removably engaged to said left hitch bracket receiver;
    a right hitch bracket removably engaged to said right hitch bracket receiver;
    a plurality of left hitch bracket holes;
    a plurality of right hitch bracket holes;
    a hitch adjuster mounting plate removably engaged to said left hitch bracket and to said right hitch bracket;
    a hitch adjuster removably engaged to said hitch adjuster mounting plate, said hitch adjuster comprising a first hitch adjuster plate and a second hitch adjuster plate;
    a plurality of clevis pins;
    a hitch ball removably engaged to said adjuster mounting plate;
    wherein, said right hitch bracket receiver and said right hitch bracket are connected by a plurality of said clevis pins;
    wherein, said left hitch bracket receiver and said left hitch bracket are removably connected by a plurality of said clevis pins so that the hitch ball may be removed from the bicycle when it is not needed and replaced on the bicycle when needed by respectively removing or inserting the clevis pins;

wherein said left connector is adapted to engage said left frame to said left mounting plate and said right connector is adapted to engage said right frame to said right mounting plate; and wherein said left hitch bracket receiver and said right hitch bracket receiver can be removably engaged to said frame by engagement of said left mounting plate and said left connector to said frame and by engagement of said right mounting plate and said right connector to said frame.

* * * * *